3,165,949
SEAL DRIVER ASSEMBLY
Walter E. Thill, Grosse Pointe Woods, Mich., assignor to Federal-Mogul-Bower Bearings, Inc., Detroit, Mich., a corporation of Michigan
Filed Aug. 30, 1961, Ser. No. 134,926
5 Claims. (Cl. 81—8.1)

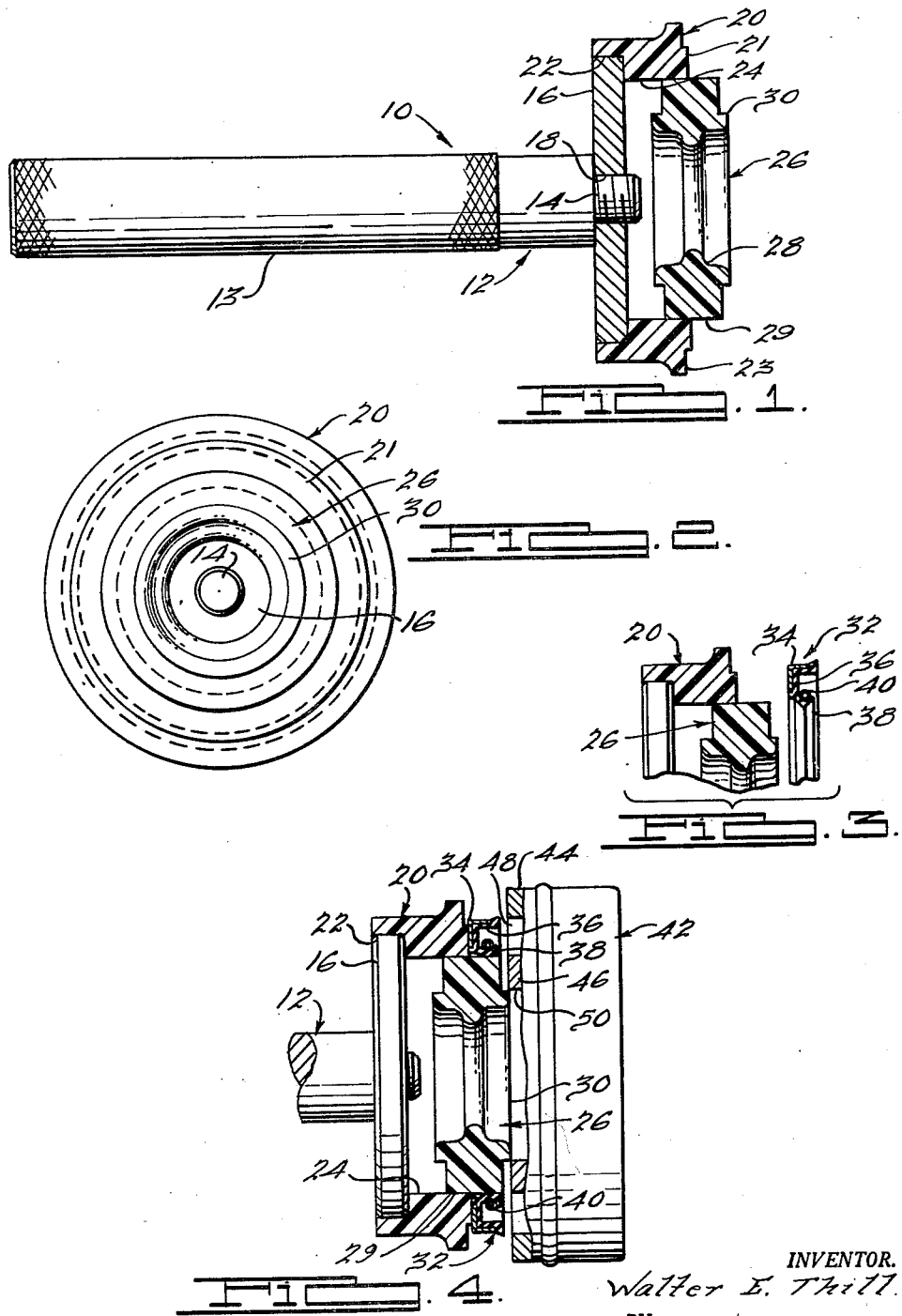

This invention relates to apparatus for installing lubrication seals.

In a bearing having inner and outer race members which are relatively rotatable with each other, it is desirable that a lubrication seal be located between the inner and outer bearing race members. One type of such seal has a circumferential lip portion which is resiliently urged into contact with the rotatable member of the bearing by means of a spring member located peripherally about the lip. The lip of such a seal, in the uninstalled condition, is moved radially inwardly by the spring to a position further than that to which it would normally be disposed if it were in abutment with the inner race member. Thus in installing such a seal in a bearing it has been common practice to use a piece of shim stock or a screw driver to move the lip radially outwardly in order to locate it circumferentially about the inner bearing race member.

It is an object of this invention, therefore, to provide a seal driver for installing a seal of the above described type in a bearing.

It is a further object of this invention to provide a seal driver for installing seals in a cavity to be sealed.

Further objects, features and advantages of this invention will become apparent from a consideration of the following description, the appended claims and the accompanying drawing in which:

FIGURE 1 is an elevational view of the seal driver assembly of this invention with a portion of the assembly shown in section;

FIGURE 2 is an end view of the assembly as shown in FIGURE 1;

FIGURE 3 is a fragmentary view showing a portion of the seal driver of FIGURE 1 and a portion of a lubricating seal to be used therewith; and FIGURE 4 is a fragmentary view, with some parts shown broken away and other parts shown in section, of the seal driver as shown in FIGURE 1 having a lubrication seal mounted thereon prior to assembly in a bearing.

Looking now to FIGURE 1, the seal driver assembly of this invention indicated generally by the numeral 10, comprises an elongated cylindrical handle member 12 having one end 13 knurled in order to facilitate gripping and having a reduced diameter threaded extension 14 at the other end. A circular driver plate 16 has a centrally disposed internally threaded bore 18 into which is threaded the handle 12 via the threaded extension 14. A molded plastic adaptor member 20 is generally annularly shaped and has a counterbore 22 in the rear surface thereof being of a diameter slightly less than the diameter of the circular plate 16 such that when the adaptor member 20 is disposed upon the circular driver plate 16, the slight interference fit frictionally holds the adaptor member 20 thereon and prevents it from falling off. On a substantially flat radially extending front face portion 23 on the adaptor 20 is located a substantially flat axially outwardly and radially outwardly extending driving boss portion 21 serving a purpose to be described. The adaptor member 20 has a centrally disposed axially straight bore 24 in communication with and coaxially located with respect to the counterbore 22 for receiving a removable molded plastic seal retainer and pilot member 26 (FIGURE 2).

The seal retainer or pilot member 26 has a generally circularly shaped external surface 29 with a diameter of a magnitude selected to create a slight interference or frictional fit when the pilot member 26 is disposed within the bore 24 in order to retain it therein and prevent it from falling out. The interference between the pilot member 26 and the bore 24 is slight allowing the pilot member 26 to slide axially within the bore 24. The seal retainer or pilot insert 26 has a central aperture 28 to provide clearance from the threaded extension portion 14 of the handle 12 and has an axially outwardly extending annular reduced diameter pilot boss portion 30 having a preselected diameter for a purpose to be described.

Looking now to FIGURE 3, a portion of the seal driver assembly is shown relative to a seal member 32 to be used therewith. The seal 32 in this instance comprises an annular metal ring member 34 having a generally L-shaped cross section and an annular resilient member 36 made of rubber or the like, having a generally U-shaped cross section and being molded with one leg free and with the two other legs fixed to the outer metal shell member 34. As shown in FIGURE 3, the free leg of the resilient member 36 has an annular radially inwardly extending lip portion 38 with an annular seat on its outer periphery into which is disposed an annular spring or resilient member 40. The spring member 40 extends peripherally within the seat of the lip portion 38 and urges the lip portion 38 radially inwardly to a diameter of a magnitude less than that of the external surface 29 of the pilot insert member 26.

The seal member 32 is to be inserted into one side of a bearing assembly 42 (FIGURE 4) which comprises an outer race member 44 and an inner race member 46. On the side of the bearing assembly 42 to be sealed, the inside diameter of the outer race member 44 and the outside diameter of the inner race member 46 define an annular recess 48 for receiving the seal member 32. The inner race 46 has an inside diameter 50 corresponding to the diameter of the drive shaft (not shown) or other type of rotatable shaft which is to be inserted therein. The seal member 32 is designed to be installed within the annular cavity 48 and to thereby provide means for sealing the lubricant within the bearing assembly 42 and prevent leakage between the outer and inner race members 44 and 46. To perform this function, the seal member 32 has dimensions such as to sealably fit within the radial aperture 48 with the lip portion 38 being urged into peripheral engagement with the outer diameter of the inner race member 46 by means of the spring member 40.

As can be seen by comparing FIGURES 3 and 4, the seal member 32 in the free or uninstalled condition has the lip portion 39 radially contracted by means of the spring member 40 to a diameter substantially less than the outside diameter of the inner race member 46. Thus manual installation of the seal member 32 within the radial recess or cavity 48 becomes increasingly difficult with the result that often a piece of shim stock or a screw driver or other type instrument is utilized to expand the lip member 38 to fit over the inner race member 46. Looking now to FIGURE 4, the pilot insert member 26 having the seal member 32 disposed about its external surface 29 is located partially axially within the bore 24 in the adaptor member 20 with the seal member 32 in radial contact with the annular drive boss portion 21. The pilot boss portion 30 of the pilot insert member 26 is of a diameter substantially equal to the inside diameter 50 of the inner race member 46, while the diameter of the external surface 29 of the pilot adaptor member 26 is substantially equal to or slightly greater than the outside diameter of the inner race member 46. Thus the seal member 32 as disposed upon the pilot insert member 26 has the lip portion 38 extended to a diameter substantially equal to or slightly greater than the outside diameter of the inner race member 46.

In installing the seal member 32, the seal driver member 10, with the seal member 32 disposed thereon as described above, is located proximate to the bearing assembly 42 and the pilot boss portion 30 on the pilot insert member 26 is disposed within the inside diameter 50 of the inner race member 46. This locates the seal member 32 in axial alignment with the radial groove or recess 48. By simply tapping the end of the handle 12 with a hammer or otherwise moving the seal driver assembly 10 axially to the right relative to the bearing assembly 42, as viewed in FIGURE 4, the adaptor member 20 is moved axially relative to the pilot insert member 26 which is held stationary by the bearing assembly 42 and hence causes the seal assembly 32 to be inserted within the radial groove 48. The drive boss 21 has an outside diameter less than the inside diameter of the outer race 44 and an inside diameter greater than the outside diameter of the inner race member 46 thereby facilitating movement of the boss 21 within the radial recess 48 until the front face portion 23 is in contact with the external surface of the outer race member 44, thus indicating that the seal member 32 has been completely installed. In this connection it should be mentioned that the pilot member 26 has a width relative to the axial depth of the bore 24 such that the pilot member 26 is movable axially rearwardly within the bore 24 to a position whereby the drive boss 21 can be inserted into the annular groove 48 during the installation of the seal member 32 as described above.

Note that the pilot member 26 serves to locate the seal driver assembly 10 with the seal member 32 thereon properly relative to the bearing assembly 42. The actual force in driving or installing the seal member 32 is applied through the adaptor member 20. The adaptor member 20 is constructed of a ring like shape such that when it is disposed on the plate 16 it is effectively out of contact and radially away from the handle 12 and its threaded extension 14. With this type of construction the shock of the blow applied to the handle 12 is not transmitted directly as a concentrated force to the adaptor member 20; consequently, the seal driver assembly 10 of this invention is usable over a prolonged service life without danger of breakage.

Various sizes of adaptor members 20 can be utilized along with various sizes of pilot insert members 26 in order to facilitate the installation of lubricating seals 32 into bearing assemblies 42 of various sizes.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A seal driver assembly for installing a substantially annular seal member comprising an elongated handle, a circular drive plate member coaxially secured to one end of said handle and having an annular support surface located substantially radially outwardly from said handle, an annular adaptor member having a centrally located axially straight bore of a preselected diameter extending axially therethrough and terminating on one side thereof in a counterbore having a diameter of a magnitude to provide a desired interference fit with said annular support surface of said driver plate member, said adaptor member being removably located upon said driver plate member with said annular support surface of said driver plate member being frictionally disposed in said counterbore, and a pilot member having an annular external surface of a preselected diameter to expandingly receive the seal and to provide a desired interference with said bore in said adaptor member and normally being frictionally disposed and axially movable within said bore.

2. A seal driver assembly for installing a substantially annular seal in an annular cavity between an inner and outer race of a bearing comprising an elongated handle, a circular drive plate member coaxially secured to one end of said handle, an annular adaptor member having a centrally located bore of a preselected diameter extending axially therethrough and terminating on one side thereof in a counterbore having a diameter of a magnitude to provide a desired interference fit with said driver plate member, said adaptor member being removably located upon said driver plate member with said driver plate member being frictionally disposed in said counterbore, and an annular pilot member having an external surface of a preselected diameter to expandingly receive the seal and to provide a desired interference fit with said bore in said adaptor member and being frictionally disposed and axially movable within said bore, said pilot member having an annular piloting boss on one side thereof to locate said seal driver assembly relative to the bearing such as to place the seal member in axial alignment with the annular cavity in the bearing.

3. A seal driver assembly for installing a substantially annular seal in an annular recess between an inner and outer race on one side of a bearing comprising an elongated handle, a circular driver plate member coaxially secured to one end of said handle, an annular adaptor member having a centrally located bore of a preselected diameter extending axially therethrough and terminating on one side thereof in a counterbore having a diameter of a magnitude to provide a desired interference fit with said driver plate member, said adaptor member being removably located upon said driver plate member with said driver plate member being frictionally disposed in said counterbore, and an annular pilot member having an external surface of a preselected diameter to expandingly receive the seal and to provide a desired interference fit with said bore in said adaptor member and being frictionally disposed and axially movable within said bore, said pilot member having an annular piloting boss on one side thereof to locate said seal driver assembly relative to the bearing such as to place the seal in axial alignment with the annular recess in the bearing, an annular drive boss portion extending axially outwardly a predetermined distance from a radially extending flat face portion located on one side of said annular adaptor member and being axially movable within the annular recess in the bearing said predetermined distance for moving the seal member into the recess until said flat face portion engages the one side of the bearing.

4. A seal driver assembly for mounting an annular seal onto an annular member comprising an elongated handle, an enlarged driver plate member secured to one end of said handle and having an annular support surface located substantially radially outwardly from said handle, an adaptor member being frictionally supported and removably disposed upon said annular support surface of said driver plate member, said adaptor member having a substantially centrally located axially straight aperture disposed substantially coaxially with said handle member and being defined by a surface spaced radially outwardly from the periphery of said handle, and a pilot member having a circular, radially outer surface for receiving a seal to be assembled and having said outer surface frictionally located in said aperture and movable axially within said aperture whereby the movement of said pilot member into said aperture causes the seal supported thereon to be moved therefrom onto the annular member.

5. A seal driver assembly for installing a substantially annular seal in a bearing comprising an elongated handle, an enlarged driver plate member secured to one end of said handle, an adaptor member being removably disposed upon said driver plate and having a substantially centrally located aperture disposed substantially coaxially with said handle member and being defined by a surface spaced radially outwardly from the periphery of said handle, said adaptor member having an annular drive boss extending axially outwardly from one side thereof a predetermined distance for engaging the seal member, and an annular pilot member frictionally disposed and movable axially within said aperture, said annular pilot member having an external surface of a preselected diameter to expandingly receive the seal member and having an annular pilot boss on one side thereof to locate said seal driver assembly relative to the bearing such as to place the seal member in installation position relative to the bearing.

References Cited by the Examiner

UNITED STATES PATENTS

| | | | |
|---|---|---|---|
| 440,444 | 11/90 | Stanton | 81—8.1 |
| 1,069,539 | 8/13 | Evans | 29—235 |
| 2,521,186 | 9/50 | Pennella | 29—275 |
| 2,860,535 | 11/58 | Fowler | 81—8.1 |
| 2,998,644 | 9/61 | Thill | 29—275 |
| 3,036,371 | 5/62 | Gray et al. | 29—235 |

FOREIGN PATENTS

| | | |
|---|---|---|
| 4,500 | 1908 | Great Britain. |

WILLIAM FELDMAN, *Primary Examiner.*

NEDWIN BERGER, MILTON S. MEHR, *Examiners.*